United States Patent [19]

Bando et al.

[11] Patent Number: 5,148,093
[45] Date of Patent: Sep. 15, 1992

[54] SYSTEM FOR CONTROLLING AC EXCITED SYNCHRONOUS MACHINE

[75] Inventors: Akira Bando; Shigehiro Kayukawa, both of Hitachi; Toshio Taguchi, Ibaraki; Yasuteru Ohno, Kobe, Junichi Shiozaki, deceased, late of Hitachi, by Junko Shiozaki, legal representative, Hitachi, Japan

[73] Assignee: Hitachi, Ltd., Tokyo, Japan

[21] Appl. No.: 584,153

[22] Filed: Sep. 18, 1990

[30] Foreign Application Priority Data

Sep. 22, 1989 [JP] Japan .................... 1-245240

[51] Int. Cl.$^5$ ............................................. H02P 5/40
[52] U.S. Cl. .................... 318/723; 318/798; 318/806; 318/779
[58] Field of Search ...................... 318/818–823, 318/720–723, 298, 806, 807–811, 778, 779

[56] References Cited

U.S. PATENT DOCUMENTS

| | | | |
|---|---|---|---|
| 4,673,858 | 6/1987 | Saito | 318/805 |
| 4,742,288 | 5/1988 | Sugimoto et al. | 318/818 |
| 4,980,629 | 12/1990 | Bando et al. | 318/799 |

*Primary Examiner*—David Smith, Jr.
*Attorney, Agent, or Firm*—Antonelli, Terry Stout & Kraus

[57] ABSTRACT

A control system for an AC excited synchronous machine for use in an electricity generator/motor system. The AC excited synchronous machine can be driven not only in a variable-speed operation based on 2-axis current control but also in a constant exciting frequency operation based on only direct-axis current component control. A phase signal is switched to drive stably the AC excited synchronoius machine in a self-excited operation or in a rotary phase modifying operation. Further, when it is desired to start pumping-up water, a synchronizing power is provided to keep constant the rotational speed of the machine at the time of establishing a desired water pressure. Because of the switching arrangement of the phase signal, the AC excited synchronous machine can be operated as an ordinary synchronous machine exhibiting ordinary synchronous characteristics, that is, self-excited operation characteristics, rotary phase modifying operation characteristics and pumping-up start characteristics. Even when the synchronous machine is cutoff from an AC power system and the voltage of the synchronous machine is abruptly changed, the stable self-excited operation of the machine can be realized.

4 Claims, 7 Drawing Sheets

SYSTEM FOR CONTROLLING AC EXCITED SYNCHRONOUS MACHINE

BACKGROUND OF THE INVENTION

1. Field of the Invention

The present invention generally relates to a variable-speed generator/motor system using an AC excited synchronous machine and, more particularly, to a system for controlling an AC excited synchronous machine which can be suitably used as a load adjuster/rotary phase modifier in order to improve the stability of an AC power system.

BRIEF DESCRIPTION OF THE DRAWINGS

The prior art and preferred embodiments of the present invention will now be described in conjunction with the accompanying drawings, in which.

Description of the Prior Art

There has been suggested a prior art generator/motor system using an AC excited synchronous machine which makes the most use of a function of being able to quickly adjust active and reactive power which is a feature of such an AC excited type and when the system is cut off from an AC power system, suppresses an exciting frequency to below a preset level, to thereby exhibit a self-excited operation function competitive with a DC excited synchronous machine. Such a prior art system will be explained below by referring to FIG. 1.

Figure 1:
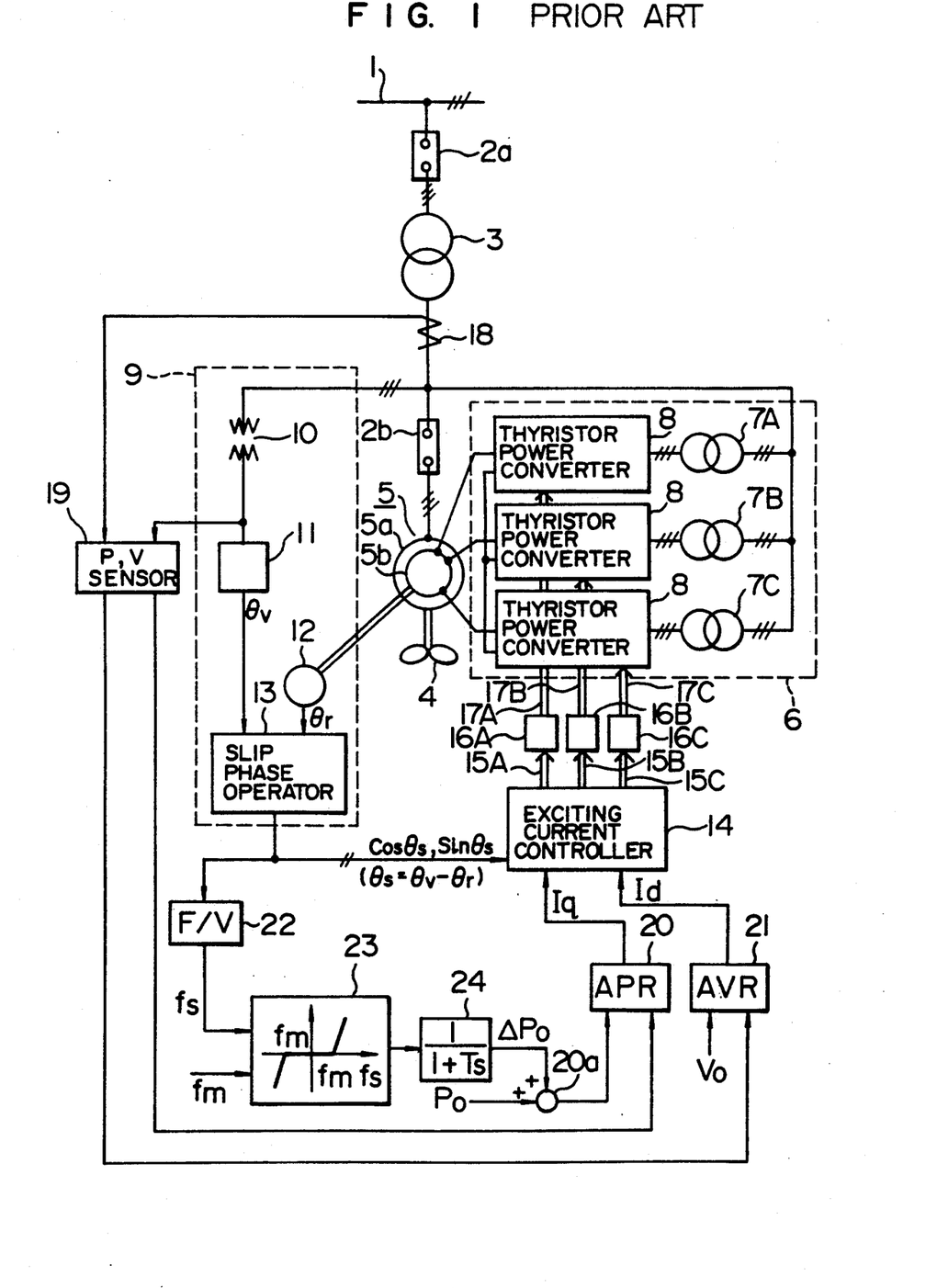
FIG. 1 is a block diagram showing a prior art system for controlling an AC excited synchronous machine.

In the drawing, an AC excited synchronous machine 5 has an armature winding 5a which is connected to an AC system 1 through a synchronous circuit breaker 2b, a main transformer 3 and a system circuit breaker 2a.

Directly coupled to the AC excited synchronous machine 5 is a pump/water wheel 4 which acts as a water wheel in an electricity generation mode and acts as a pump in a water pumping-up mode.

A frequency conversion unit 6 includes 3-phase exciting transformers 7A, 7B and 7C connected to the AC system 1, and 3-phase thyristor power converters 8 for converting AC system frequency powers transformed by the transformers 7A, 7B and 7C into low frequency AC power respectively, these transformers being independently provided with respect to the different phases of an exciting winding 5b of the AC excited synchronous machine 5.

A phase detection unit 9 includes a voltage transformer 10 for detecting a system voltage phase $\theta_v$, a voltage phase operator 11, a resolver 12 for detecting a rotary phase $\theta_r$ expressed in terms of an electrical angle of the AC excited synchronous machine 5, and a slip phase operator 13.

An exciting current controller 14 functions to adjust the amplitude and phase of 3 phase AC current commands rotating together with the slip phase $\theta_s$ on the basis of current commands $I_q$ and $I_d$ of two mutually perpendicular axes, i.e., a quadrature axis and a direct axis, received therefrom, and to supply to automatic pulse phase shifters 16A, 16B and 16C firing angle signals 15A, 15B and 15C which are then supplied to associated thyristors of the thyristor power converters 8 as main switching elements, so that the exciting winding currents of the AC excited synchronous machine 5 coincide with the 3 phase AC current commands. As a result, automatic pulse phase shifters 16A, 16B and 16C output firing pulse signals 17A, 17B and 17C respectively.

In this case, the current commands adjusted by the exciting current controller 14 may be provided in such a method as described, for example, in JP-B-53-7628 and JP-B-57-60645.

That is, when this method is employed, the current command $I_q$ with respect to a current component in phase with the slip phase $\theta_s$ is adjusted to control an effective power output, while the current command $I_d$ with respect to a current component shifted by 90 degrees from the slip phase $\theta_s$ is adjusted to control a voltage.

The effective power output and voltage are obtained from a current transformer 18 and the voltage transformer 10, converted into predetermined DC signals at a P, V sensor 19 and then applied to an automatic effective-power regulator (APR) 20 and an automatic voltage regulator (AVR) 21, respectively.

Meanwhile, a slip phase signal issued from the slip phase operator 13 is supplied to a voltage/frequency converter (F/V) 22 to be converted into a slip frequency signal $f_s$ therein. The slip frequency signal $f_s$ is converted into an output correction command $\Delta P_o$ through a dead zone circuit 23 for generating a signal only when the slip frequency signal $f_s$ is out of a range $(-f_m \leq f_s \leq +f_m$, where the frequency $f_m$ is determined by the output voltage limit of the frequency conversion unit 6) and through a first-order time lag element 24 for moderating its output variation. The output correction command $\Delta P_o$ is further added at an adder 20a to an output command $P_o$ to be inputted to the automatic effective-power regulator 20. In this case, these commands $\Delta P_o$ and $P_o$ are defined as positive when the AC excited synchronous machine 5 is operated as a motors and driven in its accelerating rotational direction in the water pumping-up mode.

The aforementioned prior art has had such a problem that no consideration is paid to the rotary phase modifying operation in which even the AC exciting operation has substantially no effect on the ordinate-axis current component control, whereby the operation control system is complicated.

The prior art also has another problem that no consideration is paid to the fact that the adjustment of the ordinate-axis current command for the purpose of suppressing the slip frequency in the self-excited operation mode causes the generator voltage to be varied, so that when the voltage is abruptly changed such as when the system is cut off, the quadrature-axis current command causes the deterioration of the voltage control characteristics, thus resulting in that the self-excited operation sustaining ability of the system is inferior to that of a synchronous machine.

SUMMARY OF THE INVENTION

It is a major object of the present invention to provide a system for controlling an AC excited synchronous machine which can suppress an abrupt change in a voltage when cut off from an AC system and also can easily realize a stable self-excited operation.

Another object of the invention is to realize a control system in a variable-speed pumped-storage hydroelectric plant which can smoothly switch between a rotary phase modifying operation and a load operation in both rotational directions as a water wheel and a pump.

A further object of the invention is to provide a control system which can stably maintain a predetermined rotational speed even when the load of a pump is abruptly changed at the time of starting pumping-up water.

In accordance with one aspect of the present invention, the above first object is attained by providing such a control system that can realize not only a variable-speed operation of an AC excited synchronous machine based on 2-axis current control but also a synchronous operation of a constant exciting frequency based on an only-direct-axis current component control.

In accordance with another aspect of the present invention, the above second object is attained by providing a control system that can switch between phase signals to thereby provide stable self-excited and rotary phase modifying operations.

In accordance with a further aspect of the present invention, the above third object is attained by a control system which produces a synchronizing power when a water pressure is established in a water pumping-up start mode.

The switching of the phase signal enables the AC excited synchronous machine to be used to exhibit its ordinary synchronous machine characteristics. As a result, the control system can show self-excited, rotary phase modifying and pumping-up start characteristics competitive with those of a synchronous machine, whereby stable operating characteristics can be obtained.

DESCRIPTION OF THE PREFERRED EMBODIMENTS

The present invention will be detailed by referring to preferred embodiments shown in attached drawings.

Figure 2:
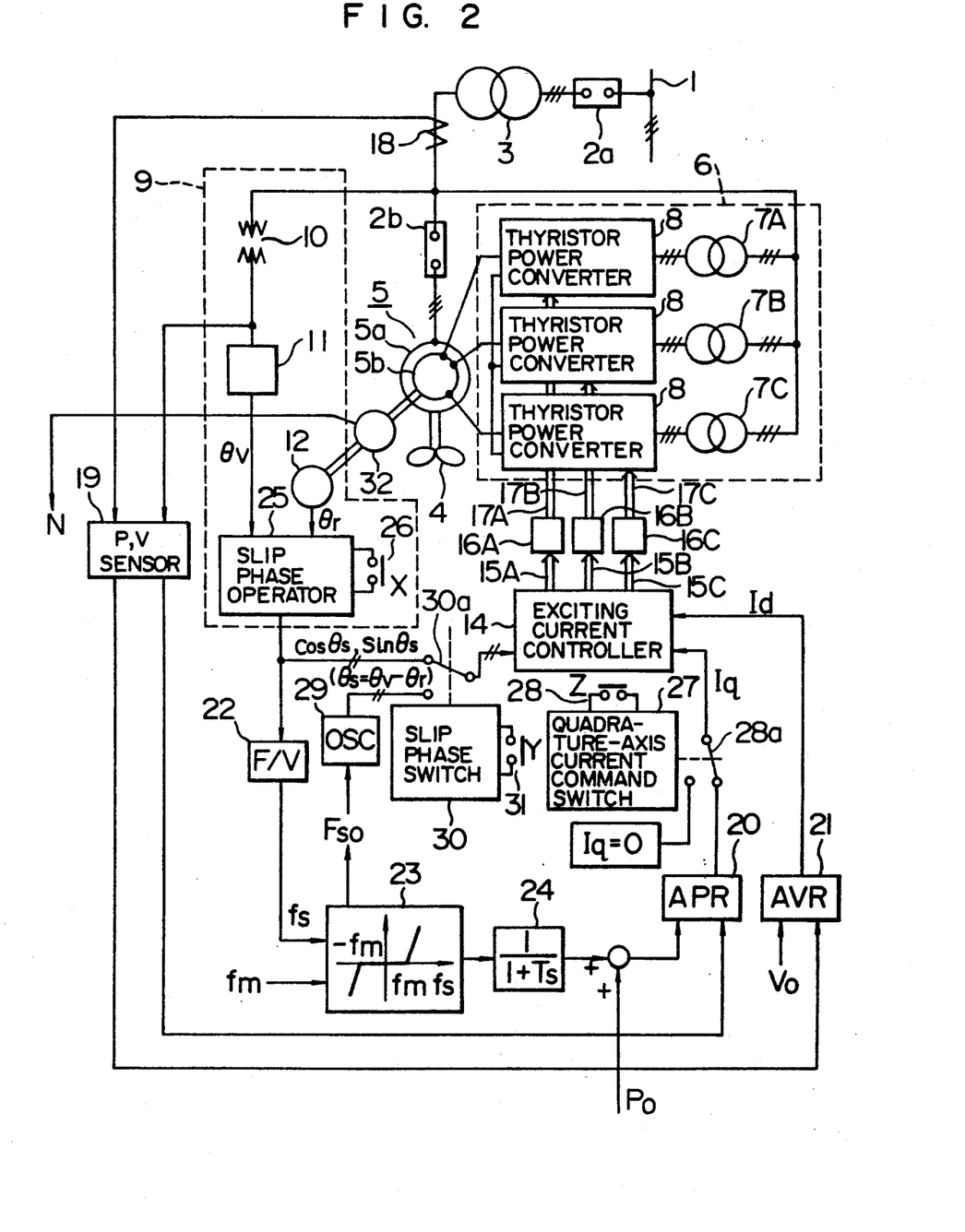
FIG. 2 is a block diagram showing a system for controlling an AC excited synchronous machine in accordance with a first embodiment of the present invention.

Referring first to FIG. 2, there is shown a first embodiment of the present invention, in which the same parts as those in the prior art of FIG. 1 are denoted by the same reference numerals and explanation thereof is omitted.

In FIG. 2, a slip phase operator 25 performs substantially the same operation as the slip phase operator 13 in the prior art, but when a make contact switch X 26 is closed the operator 25 is arranged to hold slip phase outputs $\sin \theta_s$ and $\cos \theta_s$. Thus, when the make contact switch X is closed, the system enters into a DC exciting operation.

An ordinate-axis current command switch 27 acts, when a make contact switch Z 28 is closed, to change over a switch 28a, whereby the ordinate-axis current command $I_q$ is made zero and then applied to the exciting current controller 14.

A 2-phase oscillator 29 functions to output a sinusoidal wave of a set slip frequency value $F_{so}$.

A slip phase switch 30, when a make contact switch Y 31 is closed, acts to change over a switch 30a, whereby an output of the 2-phase oscillator 29 is connected to the exciting current controller 14.

Accordingly, when the make contact switches X and Y are opened and closed, the slip frequency is made to be $F_{so}$ or zero (DC), which results in that the AC excited machine 5 can enter into its synchronous operation. When the make contact switch Z is closed, this causes the system to be put in such a mode that only a direct-axis current is controlled as in an ordinary synchronous machine.

Figure 3:
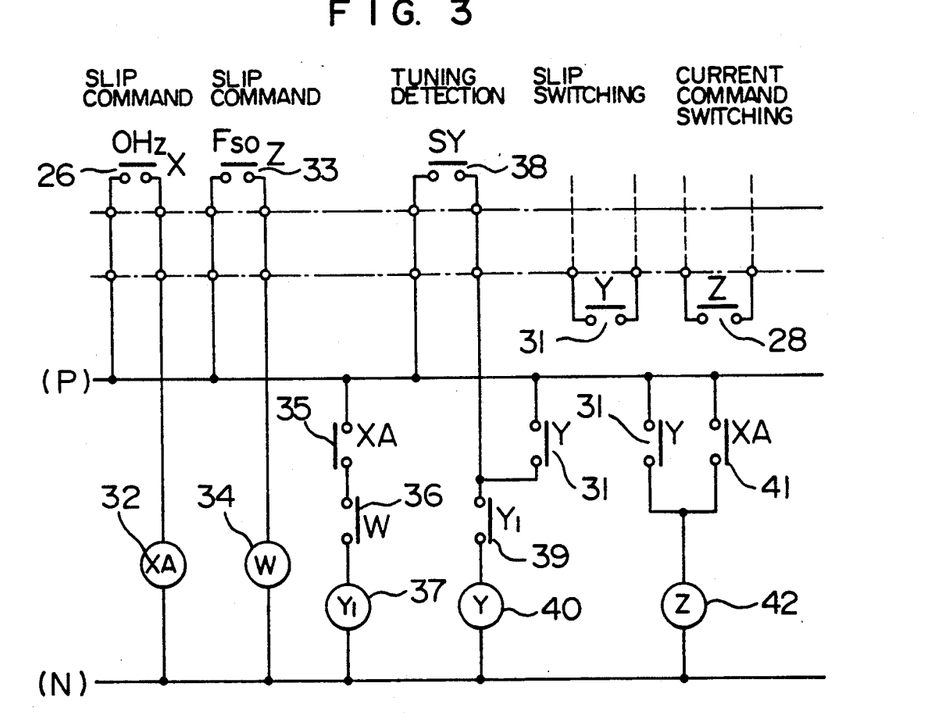
FIGS. 3 and 4 show different circuit diagrams for carrying out a phase signal switching operation in the first embodiment of the present invention, respectively.
Figure 4:
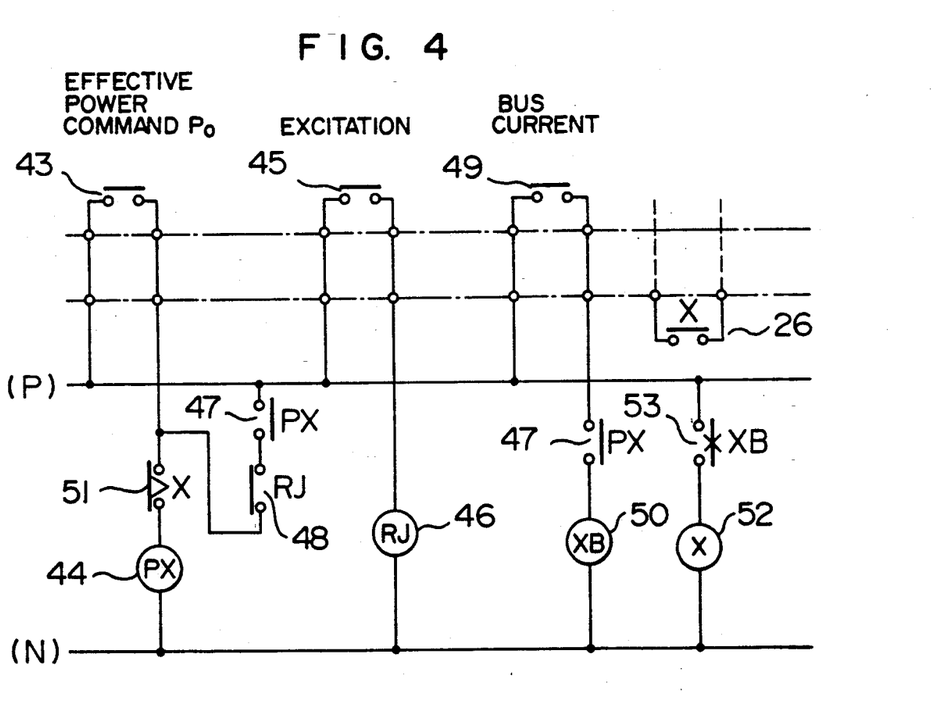

FIGS. 3 and 4 are circuit diagrams of different examples for performing the phase signal switching operation of the first embodiment of FIG. 2.

Explanation will first be made as to the control operation of the contact switches X, Y and Z in connection with FIG. 3. First, when a DC exciting command is inputted, this causes the make contact switch X 26 to be closed so that an auxiliary relay XA 32 is excited. When a slip constant command is inputted, on the other hand, this causes a make contact switch 33 to be closed so that a relay W 34 is excited. At this time, if a break contact switch XA 35 is not opened by the DC exciting command, then a relay $Y_1$ 37 is excited through the break contact switch XA 35 and a make contact switch W 36.

A tuning detection contact switch 38 is closed when the output of the 2-phase oscillator 29 is synchronized with the output of the slip phase operator 25 within an allowable range.

When synchronization between the two sorts of phase signals is confirmed under a condition that the slip constant command causes the make contact switch $Y_1$ 39 to be closed, the tuning detection contact switch SY 38 is closed so that a relay Y 40 is excited and a make contact switch Y 31 is closed, whereby the system enters into a constant rotational speed operation of the slip frequency set value $F_{so}$.

When the slip frequency is fixed at the set value Fso or DC excitation is set, the make contact switches 31 and 41 are closed to excite a relay Z 42, whereby the make contact switch Z 28 is closed and the command switch 27 causes the $I_q$ command to be set at zero.

In accordance with the present embodiment, when the system is shifted to a constant slip frequency operation, confirmation is made as to synchronization between the two sorts of phase signals, i.e., between the output signals of the slip phase operator 25 and 2-phase oscillator 29. As a result, the control mode of the system can be smoothly switched and the system can be suitably shifted, in particular, to the rotary phase modifying operation.

In the event where the set value $F_{so}$ of the slip frequency is positive, the AC excited synchronous machine 5 is driven at a constant speed below its synchronous speed and thus can be advantageously reduced in its mechanical loss during its rotary phase modifying operation.

When the set value $F_{so}$ of the slip frequency is set to be the output $f_s$ of the voltage/frequency converter F/V 22, the switching of the control mode causes no speed change, which is suitable in the case where the synchronous machine has a large inertial moment in its rotary part.

Shown in FIG. 4 is another example of the phase signal switching operation of FIG. 2, wherein, when the absolute value of the effective power command $P_o$ exceeds a set value, a make contact switch 43 is closed.

While the frequency conversion unit 6 is operated, an excitation make-contact switch 45 is closed to thereby excite a relay RJ 46.

So long as the frequency conversion unit 6 is in operation and the slip phase operator 25 is used to provide a variable-speed operation, a time limit make contact switch 51 is closed.

Under this condition, when the synchronous circuit breaker 2b (refer to FIG. 2) is closed and inserted in parallel and thereafter the effective power command increases, a make contact switch 43 is closed to excite a relay PX 44. The relay PX 44 keeps its contacts until the frequency conversion unit 6 is stopped to open a break contact switch 48 or until the synchronous machine enters into the self-excited operation to open the time limit break-contact switch 51.

A make contact switch 49 is closed when a bus current detected at the current transformer 18 (see FIG. 2) becomes below a set value.

When the AC excited synchronous machine 5 is in the load operation, a make contact switch 47 is in its closed state so that, when the synchronous machine 5 is cut off from the AC system 1, the make contact switch 49 is closed to excite a relay XB 50. This results in that a manual reset make-contact switch 53 is closed to excite a relay X 52, whereby the make contact switch X 26 is closed so that the output of the slip phase operator 25 is kept and the AC excited synchronous machine 5 enters into the self-excited operation based on DC excitation. The relay XB 50 is deexcited by the time limit make-contact switch 51.

Next, explanation will be made as to the procedure when the synchronous machine is returned from the self-excited operation to the ordinary operation.

That is, the system circuit breaker 2a is released, the rotational speed of the AC excited synchronous machine 5 is adjusted at its synchronous speed, the synchronization and voltage at both sides of the system circuit breaker 2a are checked and then closed and inserted in parallel. Thereafter, the manual reset make-contact switch 53 is opened to again release the hold state of the slip phase operator 25.

According to the present embodiment, even when the detected current value becomes zero immediately after the parallel connection of the synchronous machine through the 2b or system circuit breaker 2a, the cut-off detection contact switch will not be erroneously operated, thus enabling the set value of the detected current to be increased and preventing any erroneous operation due to a detection error.

Further, since a current signal is used to detect the cut-off condition, such a situation that a power signal becomes zero in a transient phenomenon after the occurrence of an abnormality in the power supply system side can be eliminated and thus any erroneous operation can be advantageously removed.

Figure 5:
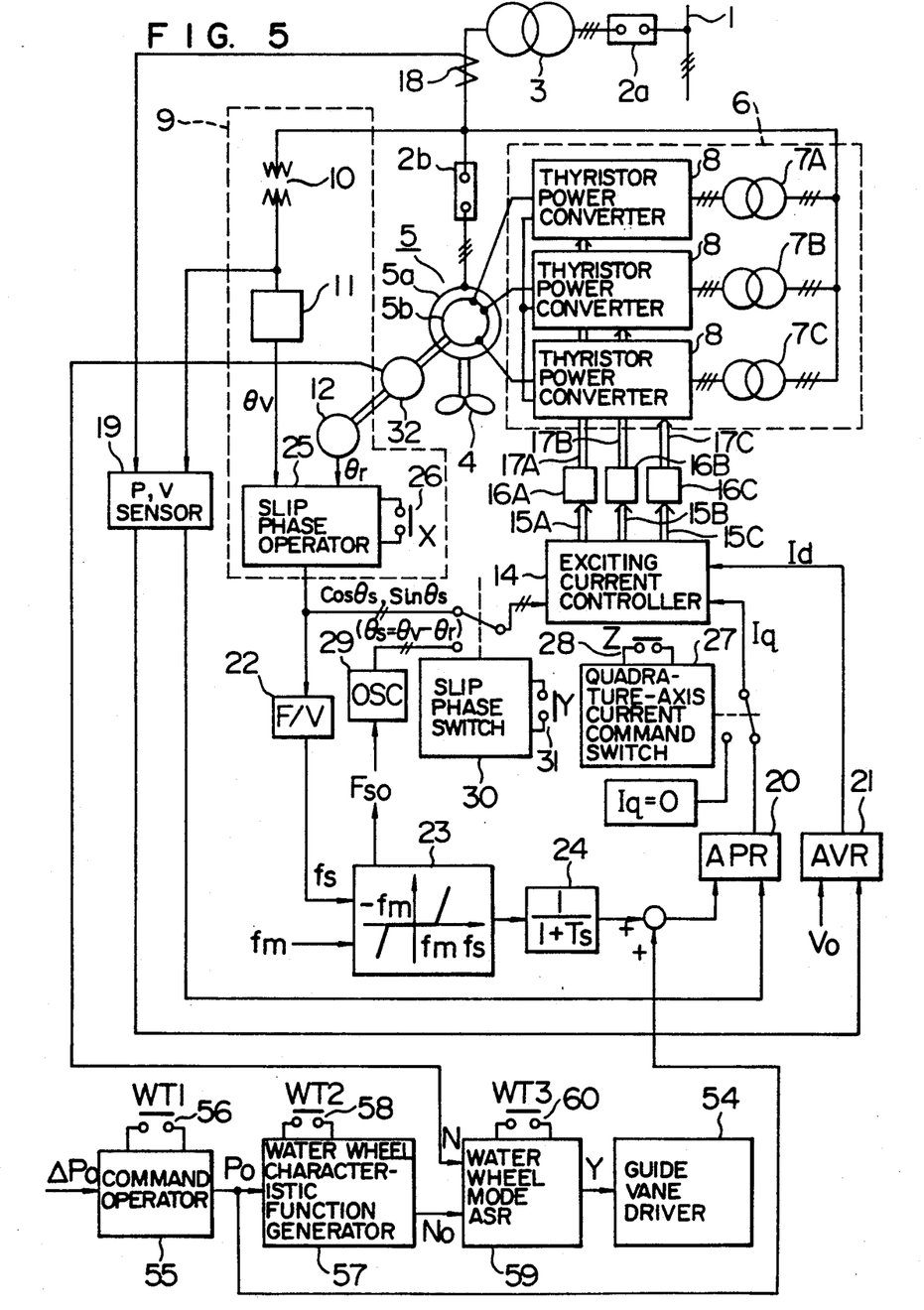
FIG. 5 is a block diagram of a system for controlling an AC excited synchronous machine in accordance with a second embodiment of the present invention.

There is shown in FIG. 5 a second embodiment in which the present invention is applied to a variable-speed water wheel electricity generation system. In the drawing, a guide vane driver 54 for a reversible pump/water wheel 4 is operated under the control of a guide vane opening command.

A command operator 55 calculates an effective power command $P_o$ on the basis of an effective-power variation command $\Delta P_o$ received from an external device. A water wheel characteristic function generator 57 computes an optimum rotational speed command $N_o$. A water wheel speed regulator 59 adjusts the guide vane opening command Y so that a difference between the command speed $N_o$ received from the water wheel characteristic function generator 57 and the speed signal N received from a rotational speed detector 32 becomes zero.

When the guide vane opening of the water wheel exceeds its start set opening and the synchronous circuit breaker 2b is connected in parallel, the pump/water wheel 4 functions as a prime mover to drivingly rotate the AC excited synchronous machine 5. When the synchronous machine 5 is desired to be shifted to the rotary phase modifying mode under this operational conditions, a contact switch 56 is first operated to reduce the effective power command $P_o$ down to zero and at the same time, a contact switch 58 is operated so that the rotational speed command $N_o$ is switched to a value $N_{so}$ corresponding to the set value $F_{so}$ of the slip frequency. After the rotational speed is set, the contact switch 33 is closed to put the synchronous machine in a constant speed operation of the exciting frequency $F_{so}$. At this stage, a contact switch 60 is operated under a condition that the slip change-over contact switch 31 is in its closed state, thereby fully closing the guide vane opening Y. As a result, the AC excited synchronous machine 5 is put in the motor operation under the influence of the synchronizing power with the AC system 1.

Conversely, when the synchronous machine is desired to be shifted from the rotary phase modifying operation to the water wheel operation, the contact switch 60 is again operated to open the guide vane to its start opening. Then, under a condition that the command value to the water wheel speed regulator 59 is $N_{so}$, the regulator 59 is operated simultaneously with the opening of the contact switch 31, with the result that the pump/water wheel 4 acts again as a prime mover.

Accordingly, after the limitation of the guide vane opening is released, when the contact switch 56 is again operated to increase the effective power command $P_o$, a predetermined electricity generating operation can be realized.

According to the second embodiment of the present invention, since the command value to the water wheel speed regulator is arranged to coincide with the value in the rotary phase modifying operation at the time of switching between the rotary phase modifying operation and water wheel operation, smooth switching of the control mode can be realized.

A third embodiment of the present invention will next be explained with reference to FIGS. 6 and 7.

Figure 6:
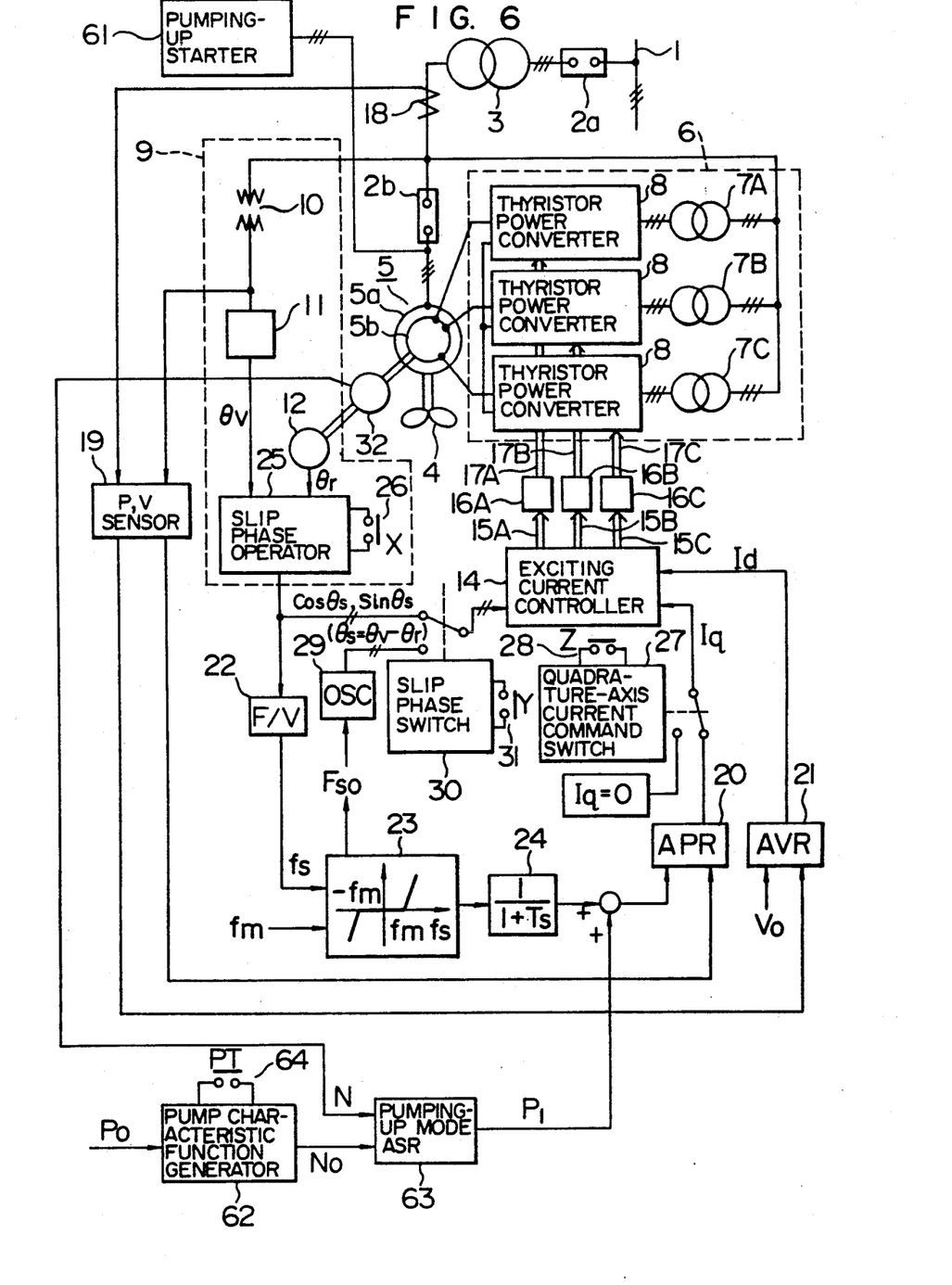
FIG. 6 is a block diagram of a system for controlling an AC excited synchronous machine in accordance with a third embodiment of the present invention.
Figure 7:
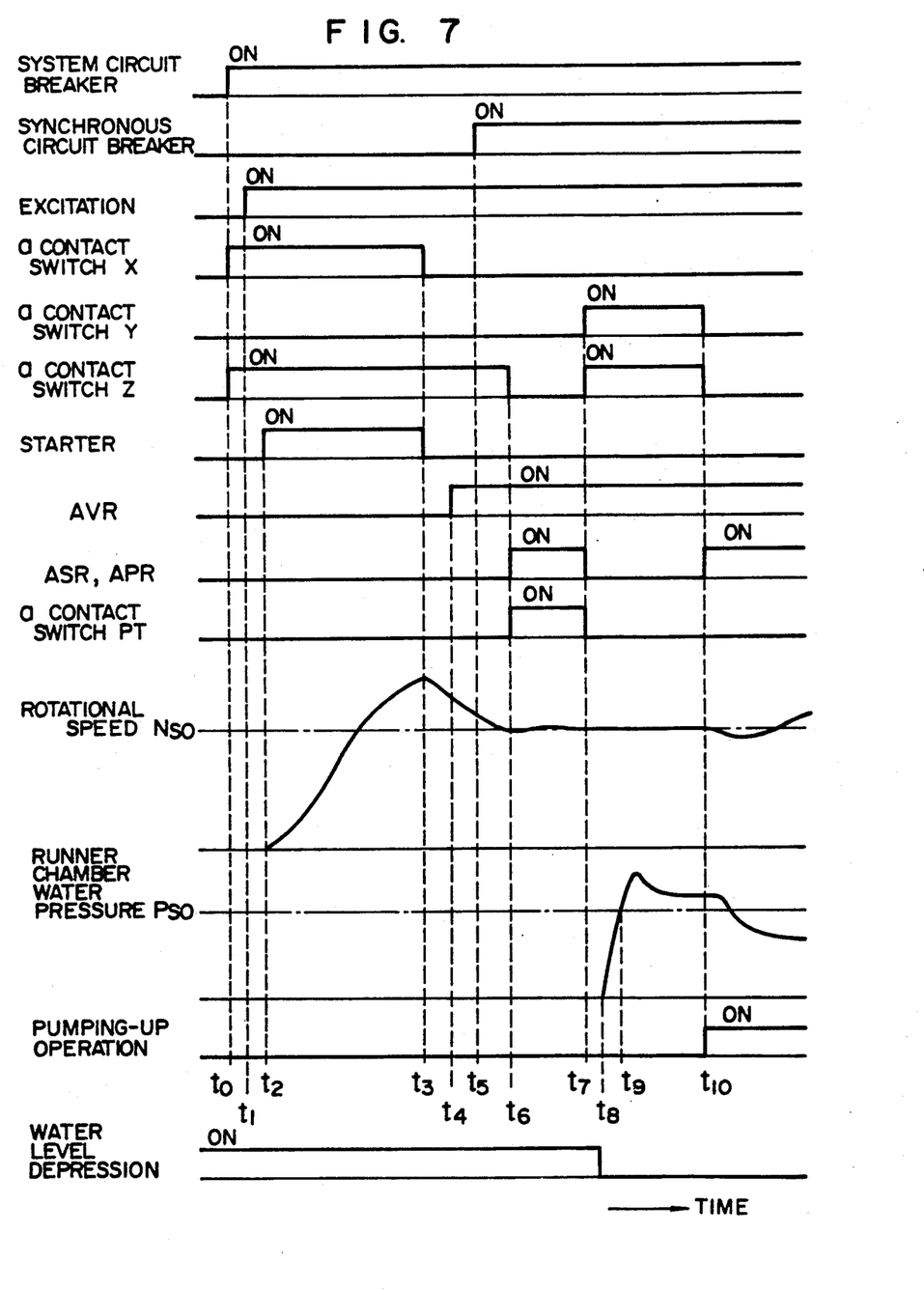
FIG. 7 is a timing chart for explaining the operation of the third embodiment of FIG. 6.

A control system of FIG. 6 includes a water pumping-up starter 61, a pump characteristic function generator 62 for calculating a rotary speed command $N_o$ on the basis of a water pumping-up input command received from an external device, and a water pumping-up mode speed controller 63 for calculating an effective power command $P_1$ so that a difference between a rotational speed command value $N_o$ received from the function generator 62 and a detected value N received from a rotational speed detector 32. When a make contact switch PT 64 is operated, the rotational speed command $N_o$ is switched to a value $N_{so}$ corresponding to a set value $F_{so}$ of the slip frequency.

Explanation will be made as to the procedure until the variable-speed water pumping-up system having the above arrangement starts its water pumping-up operation by referring to FIG. 7.

More specifically, at the same time when the system circuit breaker 2a is turned ON at a time $t_0$, the make contact switches 26 and 28 (X and Z) are closed to switch the synchronous machine to the DC exciting mode.

The operation of the frequency conversion unit 6 is started at a time $t_1$ so that, when the starter 61 is started at a time $t_2$, the acceleration of the rotational speed is started.

As soon as the acceleration is finished and the starter 61 is stopped at a time $t_3$, the make contact switch X 26 is opened to terminate the DC excitation, during which the rotational speed is gradually decreased.

At a time $t_4$, the voltage controller 21 is started to put the synchronous machine in the parallel operation. In this connection, the synchronization only requires, on principle, its confirmation, after which the synchronous circuit breaker 2b is immediately closed at a time $t_5$ to provide the parallel mode.

At a time $t_6$ after the voltage is established, the hold state of the ordinate-axis current command is released and also the speed controller 63 and the automatic effective-power controller 20 are also operated. At this time, the contact switch 64 causes the rotational speed command $N_{so}$ to be fixed at $N_{so}$.

At a time $t_7$, when the rotational speed is regulated at $N_{so}$, the make contact switch Y is closed and the synchronous machine enters into the rotary phase modifying operation at the slip frequency $F_{so}$. When the monotonous decrease of the rotational speed is taken into consideration, the rotational speed control operation in a period from the time $t_6$ to the time $t_7$ may be omitted.

After water level depression is released at a time $t_8$, the establishment of a priming water pressure at a time $t_9$ can be confirmed by the water pressure of a runner chamber exceeding the set value $P_{so}$. Between the times $t_8$ and $t_9$, the input of the pump/water wheel is abruptly changed but the rotational speed is kept constant under the influence of the synchronizing power.

At a time $t_{10}$, the opening of the guide vane exceeds its set value and when the control of the ordinate-axis component current command is started to start the water pumping-up operation, the starting operation is completed.

In accordance with the third embodiment of the present invention, since acceleration is realized under the rotational speed control prior to the establishment of the water pressure, restart due to a failure in the parallel operation can be made unnecessary.

In accordance with the present invention, since a water pumping-up electricity generation system using an AC excited synchronous machine can be used in substantially the same operational mode as an ordinary synchronous machine as necessary, when a self-excited operation, a rotary phase modifying operation or water pumping-up start operation is desired, the desired operation can be realized readily and smoothly with a high stability.

What is claimed is:

1. A control system for an AC excited synchronous machine comprising:

an AC excited synchronous machine having an armature winding connected to an AC power system and an exciting winding to which AC exciting power is supplied from said AC power system through a frequency converting means;

first phase signal generating means for generating a slip phase signal corresponding to a difference between a voltage phase of the AC power system and a rotary phase of said AC excited synchronous machine;

exciting current computing means for computing an exciting current command value on the basis of a quadrature-axis current component command value having the same phase as said slip phase signal from said first phase signal generating means and a direct-axis current component command value having a phase lag of 90 degrees with respect to said slip phase signal;

second phase signal generating means for generating a sinusoidal wave signal having a predetermined frequency;

phase signal switching means for switching from an output of said first phase signal generating means to an output of said second phase signal generating means and outputting said output of said second phase signal generating means to said frequency converting means; and command value switching means for switching said quadrature-axis current component command value to a predetermined value;

wherein said phase signal switching means and said command value switching means are operated at the same time and said frequency converting means is controlled by said exciting current command value to controllably drive said AC excited synchronous machine.

2. A control system for an AC excited synchronous machine as set forth in claim 1, further comprising cut-off detecting means for detecting a cut-off of both the armature winding of said AC exciting synchronous machine and said frequency converting means, and wherein said phase signal switching means and said command value switching means are operated on the basis of a cut-off result detected by said cut-off detecting means.

3. A control system for an AC excited synchronous machine as set forth in claim 1, wherein said AC excited synchronous machine is a generator/motor of a variable-speed water pumping-up electricity generation system which is directly coupled to a variable-speed pump/water wheel and whose rotational speed is varied according to its effective power input, and wherein, when a pumping-up operation command is inputted under such an operational condition that said generator/motor is controlled by said second phase signal generating means, a priming water pressure of said variable-speed pump water wheel is established and then a switching operation to said output of said first phase signal generating means is carried out and at the same time, an adjusting operation of said quadrature-axis component current is started.

4. A control system for an AC excited synchronous machine as set forth in claim 1, further comprising slip frequency detecting means for detecting a frequency of said slip phase signal from said first phase signal generating means, and wherein a slip frequency signal of said slip frequency detecting means is set to be a set value of said second phase signal generating means.

* * * * *